March 31, 1959 R. R. AUDETTE 2,880,020
HOSE COUPLING WITH WEDGE HOSE GRIPPING MEANS
Filed Oct. 12, 1955 2 Sheets-Sheet 1
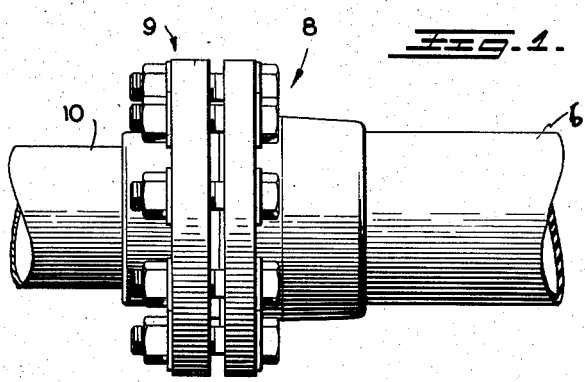
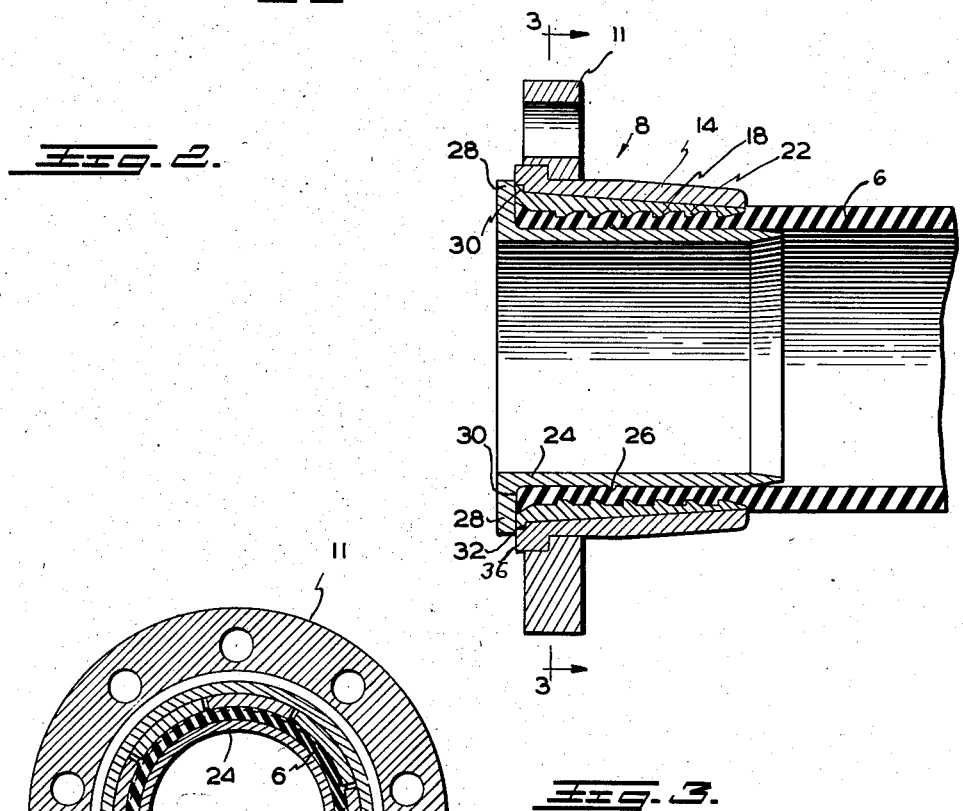
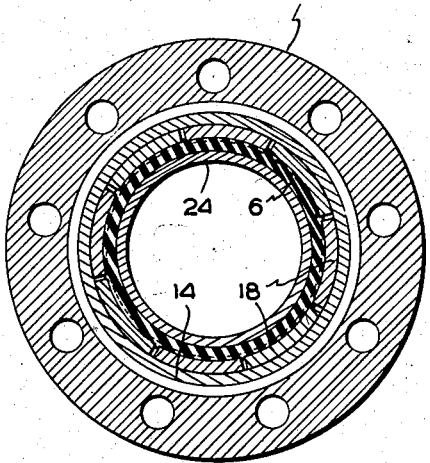
INVENTOR
RICHARD R. AUDETTE
BY George Sipkin
B. L. Zangwill
ATTORNEYS March 31, 1959 R. R. AUDETTE 2,880,020
HOSE COUPLING WITH WEDGE HOSE GRIPPING MEANS
Filed Oct. 12, 1955 2 Sheets-Sheet 2

INVENTOR.
RICHARD R. AUDETTE
BY George Sipkin
B. L. Zanguill

United States Patent Office 2,880,020
Patented Mar. 31, 1959

2,880,020

HOSE COUPLING WITH WEDGE HOSE GRIPPING MEANS

Richard R. Audette, Annapolis, Md.

Application October 12, 1955, Serial No. 540,176

1 Claim. (Cl. 285—255)

(Granted under Title 35, U. S. Code (1952), sec. 266)

The invention described herein may be manufactured and used by or for the Government of the United States of America for governmental purposes without the payment of any royalties thereon or therefor.

This invention relates to a hose end coupling or fitting; and more particularly relates to an improved means providing a coupling member at the end of a flexible high-pressure hose of large diameter.

In prior art devices of this type, the hose end fitting frequently consists of an outer sleeve having internal threads, said sleeve being adapted to be passed over the free end of a hose, and a nipple member having external threads and placed inside the end of said hose, said hose being sandwiched between the nipple and socket, when the two are screwed into position. The disadvantage of such an arrangement is that the assembly tends to break loose when applied to the end of a hose of large diameter which is subjected to high pressure. The hose usually slips from the coupling before the hose itself bursts.

An object of the invention is to provide an end fitting, or coupling for large diameter, high-pressure, flexible hoses.

An additional object of the present invention is to provide a hose end fitting, or coupling, that will hold a hose so securely that the hose will burst under high pressure before any yielding occurs in the coupling.

Another object is to provide an end fitting, or coupling, that has greater resistance to hose-slippage when used on a hose having a large diameter, than couplings heretofore used on such hoses.

A further object is to provide a fitting, or coupling, that is adapted to be easily attached to and removed from a large diameter hose with a minimum amount of equipment and effort.

Another object is to provide an inexpensive end fitting, or coupling, that consists of few parts and is adapted to easy, economical and rapid production.

Other objects and features will become apparent to those skilled in the art as the disclosure is made in the following detailed description of a preferred embodiment of the invention as illustrated in the accompanying sheets of drawing in which:

Fig. 1 is an elevational view of a coupling in accordance with the invention, assembled on a hose end and connected to another coupling at the end of a metal pipe;

Fig. 2 is a longitudinal sectional view of the coupling as assembled on a hose end;

Fig. 3 is a transverse sectional view taken on lines 3—3 of Fig. 2;

Figure 4:
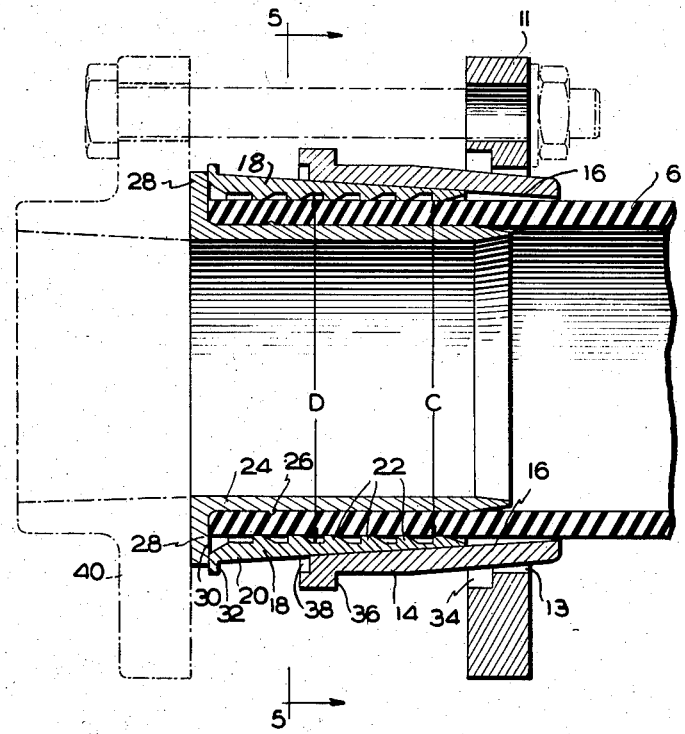
Fig. 4 is a longitudinal, sectional view, substantially to scale, of the coupling in partially assembled condition on the hose end.

Referring now to the drawings wherein like reference characters designate like or corresponding parts throughout the several views, there is shown in Fig. 1, which illustrates a preferred embodiment, a flexible hose 6 which may be of the rubber, wire-braid reinforced type, having assembled on an end thereof an end fitting or coupling member indicated in its entirety by the reference numeral 8. The coupling 8 is connected to another coupling member 9 shown at the end of a metal pipe 10.

In accordance with the invention, the hose coupling, or end fitting, 8 comprises several component elements including an annular member 11 adapted to be passed over the free end of the hose 6 by virtue of an opening 13 therein, said opening being of a diameter greater than that of the hose 6. The annular member 11 has a plurality of equally spaced bolt-holes, as shown in Fig. 5. The coupling also comprises a smooth-surfaced contracting sleeve, or tube, 14 having its internal surface 16 with a diameter which decreases toward the right, as viewed in Fig. 4, and having at least a portion of its outer diameter likewise smoothly tapering to the right.

The coupling further comprises a number of independent wedges 18 which surround the hose. Each wedge 18 is provided with a substantially smooth tapered outer surface 20 adapted to contact the inner surface of the sleeve member 14. The inner surface of each wedge 18 is provided with a number of axially spaced, circumferentially extending, raised portions, or teeth, 22 extending substantially, though not necessarily, completely from one axial side edge to the other of said wedge, said teeth being adapted to dig into the outer surface of the hose when the coupling is being assembled. To better hold the hose, the surfaces of the teeth which face the hose end are radial, that is, perpendicular to the axis of the hose. A portion of the opposite faces of each of the teeth slants, as shown in the drawings.

Inside the end of the hose 6, the coupling comprises a nipple 24 (Fig. 4) having for example, an outside diameter of 3.98 inches for application to a 4 inch hose. The outer surface of the nipple 24 is provided with a bead 26 extending substantially around said surface. It is emphasized that the portion of the nipple 24 that is within the hose 6 is, when the coupling is fully assembled on a hose end, longer than the wedges 18 and the sleeve 14 on the outside of said wedges. By virtue of the fact that the nipple 24 is longer than the wedges 18 and the sleeve 14, said wedges and sleeve are relieved from the pressure within the hose, said pressure being absorbed by that portion of the nipple 24 that is within the hose 6. The instant feature serves to eliminate any tendency of the internal hose pressure to disrupt the coupling assembly.

A recommended method of assembling the coupling on the end of a hose consists of passing the annular member 11 over said end, after which the contracting sleeve 14 is passed over said hose. Following this, the nipple 24 is inserted into the tube so that the inner face 30 of an end flange 28 of said nipple is in contact with the end of the hose. Following the insertion of the nipple, the wedges 18 are partially inserted between the contracting sleeve 14 and the hose 6 so that flanges 32 of the wedges abut flange 28. Preferably the end of the hose is held vertically and the wedges held in place by a string that is cut as soon as the parts become tight enough to stay in place.

While the wedges are held in abutting position with flange 28, the annular member 11 is forcibly moved, as subsequently described, toward the free end of the hose. The nipple 24 is held stationary. The annular member 11 is preferably provided with a recess 34 in the side face thereof nearest the end of the hose. The contracting sleeve 14 is provided with a flange 36 adapted to be received in the recess 34 as annular member 11 moves toward the end of the hose. As the annular member 11 moves axially, the coaction of the side wall of recess 34 of the member and flange 36 of sleeve 14 results in a corresponding movement of contracting sleeve 14.

This movement of contracting sleeve 14 combined with the tapering diameter of its inner surface 16, forces the wedges 18 radially inward toward the nipple 24, so that the hose is "squeezed" between the nipple 24 and wedges 18. The teeth 22 "dig" into the hose, thereby providing axial resistance to pull of the hose out of the coupling. Some of the material of the hose passes into the spaces between the wedges so that the wedges 18 can function properly, and so that the hose will not be over-compressed.

In the event that the flanges on the wedges are somewhat spaced from the flange 28 on the nipple when assembly is commenced, the structure set forth above will nevertheless bring about proper alignment of all the flanges.

Figure 5:
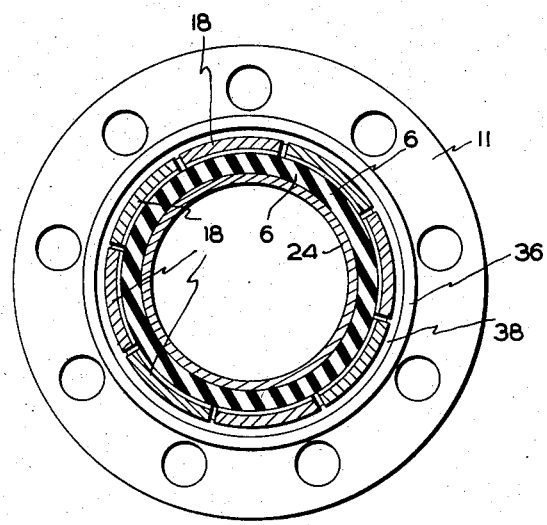
Fig. 5 is a transverse sectional view taken on lines 5—5 of Fig. 4.

A recommended method, though not the only one, for drawing annular member 11 into assembled position is to place a substantially flat draw member, such as element 40 shown in dotted lines in Fig. 4, against the face of flange 28 of nipple 24, said flat member being provided with a number of circumferentially spaced bolt holes adapted to be aligned with similarly spaced holes in the annular member 11. Upon proper alignment of the holes, headed bolts are extended through the aligned pairs thereof, and a nut is screwed onto the free end of each bolt. The nuts are then screwed down, thereby forcing annular member 11, member 14 and any wedges 18 which might not be in abutting relation to flange 28, toward said latter flange until the arrangement shown in Fig. 2 is obtained. After the arrangement shown in Fig. 2 is obtained, the free flange 40 is removed and the result is a fully assembled hose coupling.

As an example of an easy method of removing the coupling, one can use a ring-like or cup-like member having a diameter such that it extends around flange 28 and beyond the latter's outer edge, so as to abut flange 36 on sleeve 14. By hitting on the edge of the ring-like member, sleeve 14 will be driven toward the right (Fig. 2) thereby freeing the wedges 18 and permitting the complete removal of the coupling elements from the hose end.

The proper alignment of all the elements, upon assembly, is properly insured by the following important structural features.

The recess 34 of annular member 11 fits the flange 36 on the outer end of sleeve 14; and the opening 13 of the member 11 fits the outside uniform diameter portion of sleeve 14 near the flange 36. As the annular member 11 moves on the contracting sleeve 14, the walls of the recess 34 presently come into contact with flange 36 on the contracting sleeve 14. This in turn causes said sleeve 14 to move toward the left along with the annular member 11, and assures proper alignment of said members. As the member 11 and sleeve 14 come near the end of the hose in the assembling process, a recess 38 in the outer face of flange 36 on the sleeve 14 receives flanges 32 on the outer ends of the wedges 18, said wedge-carried flanges already being in abutting relation to flange 28 of nipple 24.

Thus it can be seen that the coaction of the various flanges and recesses, in the manner referred to above, assures that the various elements are aligned in a predetermined relation. Further, flanges 32 and 36 on the wedges 18 and contracting sleeve 14, respectively, abut flange 28 on the nipple, so that they cannot extend beyond the end of the hose. Additionally, when two end couplings are bolted together, the bolts further maintain the assembly.

In a preferred embodiment of the invention for a 4 inch hose having a 4 inch internal diameter and about 4¾ inch outside diameter, eight wedges were used. The wedges were made by cutting a fully formed tubular member into eight separated pieces, or wedges by axial 1/16 inch cuts. Before cutting, the inner diameter D of this tubular member at the roots of teeth 22 was held to between 4.576 and 4.586 inches, and the minimum diameter C of the teeth, was about 4.316 inches. The sleeve 14 has as overall length of 4½ inches; and the taper of the tapered outer surfaces of the wedges 18 and contracting member 14 was the equivalent of 1½ inches per foot. In choosing a taper, the taper should not be so great as to make it too difficult or impossible to draw the parts together. On the other hand, it should not be so little that the compression will not hold the hose with sufficient force.

In a test of an assembly with the improved coupling on a 4 inch hose, the coupling withstood 750 pounds per square inch pressure in the hose for five minutes without evidence of deformation, leakage or porosity of the joint comprising the hose and coupling.

Obviously many modifications and variations of the present invention are possible in the light of the above teachings. It is therefore to be understood that within the scope of the appended claim the invention may be practiced otherwise than as specifically described.

What is claimed is:

A hose coupling assembly comprising, a tubular hose-entering member dimensioned for insertion into an open end of a hose, said member having an outwardly extending flange at one end thereof, said flange being wider than the thickness of the hose and adapted to abut the end of said hose, a plurality of wedge members each having an inner wall shaped for contact with the exterior surface of a portion of hose applied to said tubular member, each wedge member having an outwardly extending flange at the thickest end thereof, and each wedge being arranged on said hose portion with its thickest end and the flange on said end in abutment with the flange on said tubular member, the portion of said tubular member in contact with the interior of said hose being longer than said wedges; an internally tapered sleeve having an outwardly extending flange at one end, an annular recess formed in said end of said sleeve having substantially the same size and shape as the flange on said wedges and being adapted to receive the respective flanges on said wedges, said sleeve being adapted to be drawn longitudinally of said hose into wedge surrounding and confining position with the flange thereon being nearest the open end of said hose in abutment with the flange on said hose entering member; and an annular member dimensioned so as to surround said sleeve, said annular member having an annular recess formed therein adjacent the inner surface thereof and having substantially the same outer diameter as the diameter of the flange on said tapered sleeve, said annular member being in abutting relation with said flange on said sleeve, said annular member being free to slide and rotate relative to said sleeve and being provided with a plurality of holes adapted to receive hose coupling connecting bolts, whereby said coupling assembly may be connected to a coupling assembly on the end of another hose or the like.

References Cited in the file of this patent

UNITED STATES PATENTS

| | | |
|---|---|---|
| 755,204 | Witzenmann | Mar. 22, 1904 |
| 1,098,294 | Patty | May 26, 1914 |
| 1,186,325 | Metzger | June 6, 1916 |
| 1,232,129 | Wafer | July 3, 1917 |
| 1,244,577 | Bennett | Oct. 30, 1917 |
| 1,887,877 | Shaffer | Nov. 15, 1932 |
| 2,081,021 | Smith | May 18, 1937 |
| 2,342,192 | Grisby | Feb. 22, 1944 |
| 2,408,960 | Stivason | Oct. 8, 1946 |

FOREIGN PATENTS

| | | |
|---|---|---|
| 3,454 | Great Britain | Feb. 18, 1895 |
| 25,701 | Great Britain | Dec. 11 1905 |